UNITED STATES PATENT OFFICE.

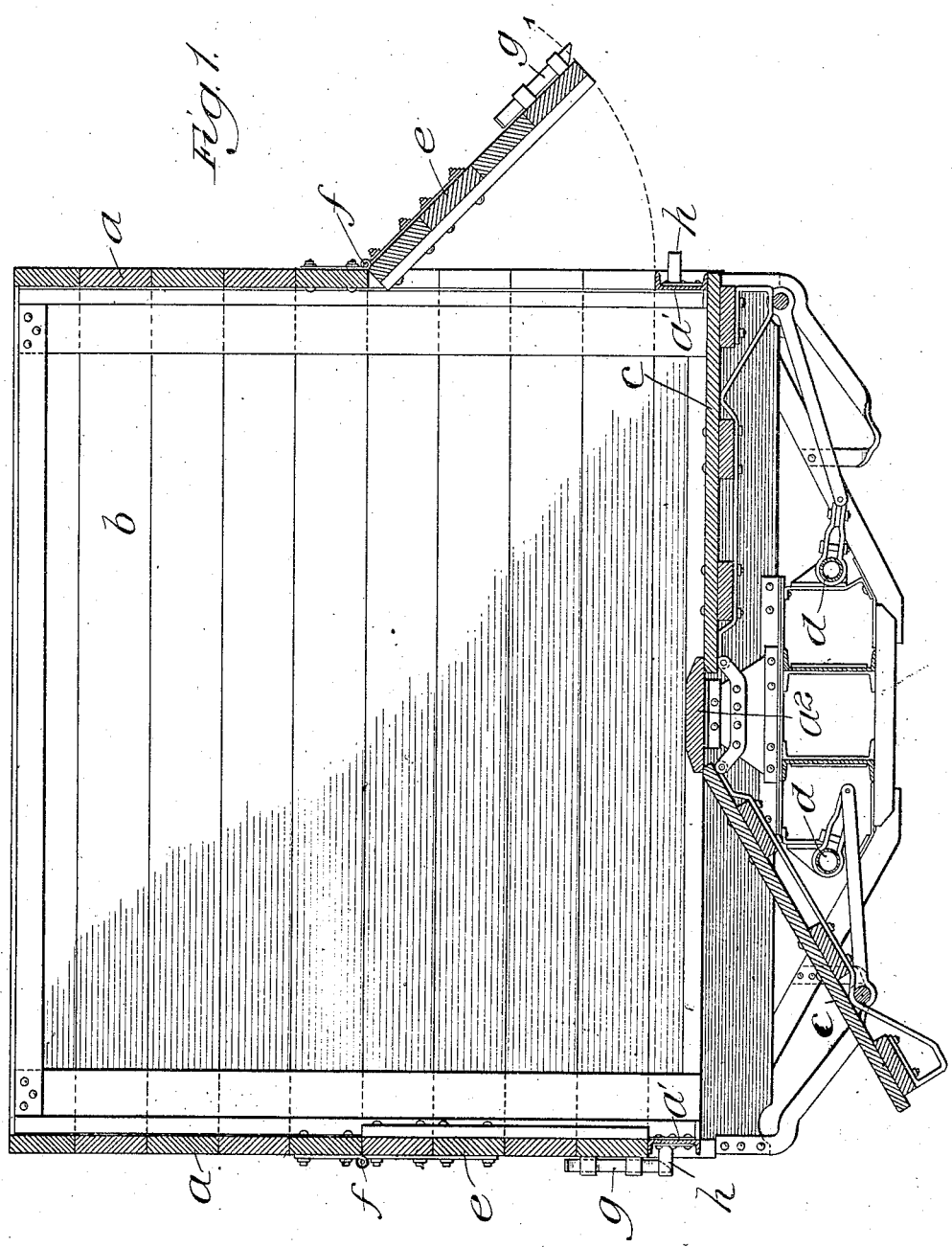

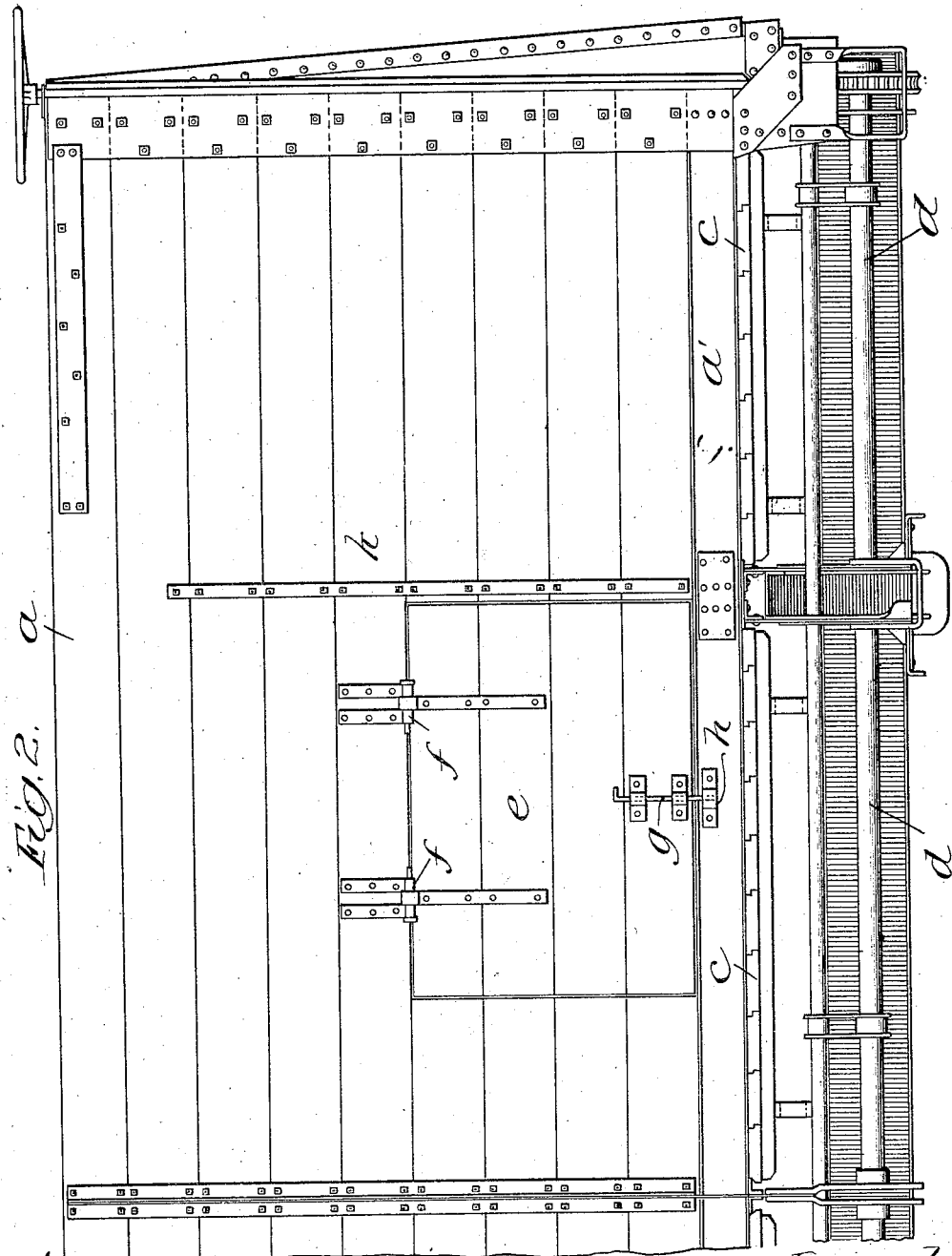

SPENCER OTIS, OF CHICAGO, ILLINOIS, ASSIGNOR TO NATIONAL DUMP CAR COMPANY, OF AUGUSTA, MAINE, A CORPORATION OF MAINE.

DUMP-CAR.

No. 888,647.   Specification of Letters Patent.   Patented May 26, 1908.

Application filed March 5, 1906. Serial No. 304,241.

*To all whom it may concern:*

Be it known that I, SPENCER OTIS, a citizen of the United States, residing at Chicago, in the county of Cook and State of Illinois, have invented certain new and useful Improvements in Dump-Cars, of which the following is a specification.

My invention relates to dump cars, and has for its object to provide a dump car having a series of dumping doors so arranged as to facilitate the discharge of the load.

My invention consists in the details and combinations hereinafter described and claimed.

In the accompanying drawings—Figure 1 is a transverse section of a dump car embodying my invention. Fig. 2 is a longitudinal elevation of a portion of a dump car having my improvements applied thereto.

In the drawings $a$ represents the sides and $b$ the ends of the dump car, these side and end portions being built considerably higher than the sides and ends of the ordinary gondola car. By this construction I may materially lessen the length of the car, at the same time retain its load-carrying capacity. The car is provided with the usual side sills $a'$ and center sills $a^2$, and the bottom of the car is composed substantially entirely of dumping doors $c$, being hinged in series on opposite sides of the center sills. Any suitable operating mechanism $d$ may be used for raising and lowering these dumping doors. This construction is usual and well-known and needs no particular description.

It will be observed that the side sills are placed above the level of the bottom dumping doors when the latter are in closed position and that the bottom of the car is substantially flat and level throughout its entire extent. It is some times impossible to dump the load through the bottom dumping doors, owing to various conditions which need not be specifically referred to. In order to facilitate the discharge of the load at these times, I provide the high side portions of the car with outwardly swinging doors $e$, openings being formed in the sides of the car for the reception of these doors. These doors are hinged at their upper ends to the upper edge of the openings by suitable hinges $f$, and they are retained in closed position by any suitable locking means, such as a sliding bolt $g$ mounted on the door engaging a keeper $h$ upon the side sills. By releasing the doors, a portion of the load may be dumped from the side of the car, as will be readily understood, while the remainder of the load may easily be shoveled through these openings. Owing to the height of the sides and ends of the car, it would be impractical to discharge the load by shoveling except for these doors. If desired both the bottom dumping doors and the side doors may be opened at the same time and the load discharged through both, or the dumping doors may be opened on one side and the side doors on the other side of the car, as circumstances may permit or render desirable. By so locating the dumping doors that the bottom doors are placed below the side sill and the side doors above the side sill I provide a car in which the frame portion is not weakened in any manner. This is an extremely desirable feature, as in all cases which I am aware in which it has been proposed to provide both side and bottom dumping doors, it has been found necessary to cut out portions of the side or center sills, thus weakening the frame of the car and lessening its powers of resistance to shocks and strains.

I claim:

1. In a dump car of the class described, having high side and end portions and side sills extending from end to end of the car, a flat and level bottom composed substantially entirely of hinged dumping doors hinged at their inner ends near the center sill, these dumping doors being below the level of the side sills when in closed position, openings in the sides of the car above the side sills, outwardly swinging doors hinged at their upper edges in the openings, and means for locking these outwardly swinging doors.

2. A car of the class described, having high side and end portions and side sills extending from end to end of the car, doors in the floor of the car entirely beneath the side sills, and doors in the sides of the car entirely above the side sills.

3. A car of the class described having high side and end portions and side sills extending from end to end of the car, doors in the floor of the car entirely beneath the side sills, said doors being hinged near the longitudinal center of the car, and doors in the sides of the car entirely above the side sills.

SPENCER OTIS.

Witnesses:
 JENNIE A. MacEDWARD,
 W. T. JONES.